(12) United States Patent
Nubbe et al.

(10) Patent No.: US 9,786,883 B2
(45) Date of Patent: Oct. 10, 2017

(54) BATTERY CONTAINMENT MESH (71) Applicant: X Development LLC, Mountain View, CA (US)

(72) Inventors: Matthew A. Nubbe, Moriarty, NM (US); Kyle A. Liske, Albuquerque, NM (US)

(73) Assignee: X Development LLC, Mountain View, CA (US)

( * ) Notice: Subject to any disclaimer, the term of this patent is extended or adjusted under 35 U.S.C. 154(b) by 418 days.

(21) Appl. No.: 14/470,515

(22) Filed: Aug. 27, 2014

(65) Prior Publication Data

US 2016/0064710 A1    Mar. 3, 2016

(51) Int. Cl.
| | | |
|---|---|---|
| *H01M 2/10* | (2006.01) | |
| *B60K 1/00* | (2006.01) | |
| *B64D 41/00* | (2006.01) | |

(52) U.S. Cl.
CPC ............. *H01M 2/1083* (2013.01); *B60K 1/00* (2013.01); *B64D 41/00* (2013.01); *H01M 2/1077* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 485,074 A * | 10/1892 | Winship | A47C 23/155 114/241 |
| 7,380,379 B2 | 6/2008 | Venegas, Jr. | |
| 8,365,803 B2 | 2/2013 | Schoenheit et al. | |
| 8,617,734 B2 | 12/2013 | Bhardwaj et al. | |
| 2003/0082455 A1 | 5/2003 | Fujiwara et al. | |
| 2006/0016633 A1 * | 1/2006 | Fujii | B60R 16/04 180/68.5 |
| 2010/0075213 A1 * | 3/2010 | Mehta | H01M 2/0257 429/120 |
| 2010/0136386 A1 | 6/2010 | Holung et al. | |
| 2011/0079456 A1 | 4/2011 | Borumand et al. | |
| 2012/0003508 A1 * | 1/2012 | Narbonne | H01M 2/1077 429/8 |
| 2012/0225331 A1 | 9/2012 | Tartaglia | |
| 2012/0276434 A1 | 11/2012 | Gaikwad et al. | |
| 2013/0224574 A1 * | 8/2013 | Favaretto | B60K 1/04 429/186 |
| 2013/0323562 A1 * | 12/2013 | Ferraro | H01M 6/36 429/112 |

FOREIGN PATENT DOCUMENTS

| | | |
|---|---|---|
| JP | 2009-211909 A | 9/2009 |
| JP | 2013-507735 A | 3/2013 |
| JP | 2014-029109 | 2/2014 |

OTHER PUBLICATIONS

PCT/US2015/042098—International Search Report and Written Opinion of the International Searching Authority, dated Oct. 16, 2015, 12 pages.

* cited by examiner

*Primary Examiner* — Sarah A Slifka
*Assistant Examiner* — Haroon S Sheikh
(74) *Attorney, Agent, or Firm* — Christensen O'Connor Johnson Kindness PLLC (57) ABSTRACT

A battery containment mesh includes a plurality of loops and a plurality of joiners that interconnect the loops into a net sized to surround a battery pack including a plurality of battery cells. The loops and the joiners are fabricated of heat resistant materials capable of maintaining physical integrity in an event of combustion of the battery pack such that the battery containment mesh can carry a weight of the battery pack after the event of combustion.

19 Claims, 6 Drawing Sheets

BATTERY CONTAINMENT MESH

TECHNICAL FIELD

This disclosure relates generally to battery containment structures in the event of catastrophic failure, and in particular but not exclusively, relates to battery containment structures for aerial vehicles.

BACKGROUND INFORMATION

Lithium ion batteries, while providing great energy density among batteries, pose a non-trivial fire hazard. For commercialized lithium ion chemistries, this hazard is usually the greatest on the highest energy density cells. This hazard is magnified when large quantities are put together, as one cell catching fire can propagate to the next, eventually engulfing the entire battery pack. Peak temperatures can exceed the melting point of steel while the remains of typical lithium ion cells will often end combustion at red heat. Additionally, the combustion products are toxic (heavy metal ash and gaseous hydrofluoric acid). Extinguishing this, once it starts, typically requires substantial cooling efforts (e.g., substantial water dousing). When the protection of nearby (or attached) equipment is desired, there should be some way of controlling both the flow of flames and the final location of the burned remains. Additionally, if the battery pack is mounted to an aircraft, simply letting these burned remains fall to the ground following a combustion event, exposes anyone or anything on the ground to the possibility of being hit by a mass of combusting batteries, causing damage from either blunt trauma or starting a fire.

A conventional technique used to try to prevent battery fires is by placing a cooling mechanism with the cells in the battery pack. Examples include phase change materials and liquids meant to be boiled. These techniques attempt to provide sufficient cooling to prevent thermal runaway or reduce concentrated heat propagation that causes the entire battery pack to catch fire.

For protection after a fire has started, conventional techniques attempt to build pressure vessels surrounding the battery pack capable of surviving the combustion event. However, these structures are often heavy, thus frustrating the weight savings achieved by using lithium ion cells.

While these conventional technologies can work, they add a nontrivial amount of mass to the entire battery enclosure, reducing the effective energy density of the overall enclosure. In an application that is highly sensitive to the overall attainable energy density (such as aerial vehicles), this is often unacceptable. Leaving no protection against a fire, while eliminating the mass penalties of these solutions, adds a substantial (and sometimes unacceptable) risk in the event that a fire actually starts.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of a system and apparatus for a battery containment mesh are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
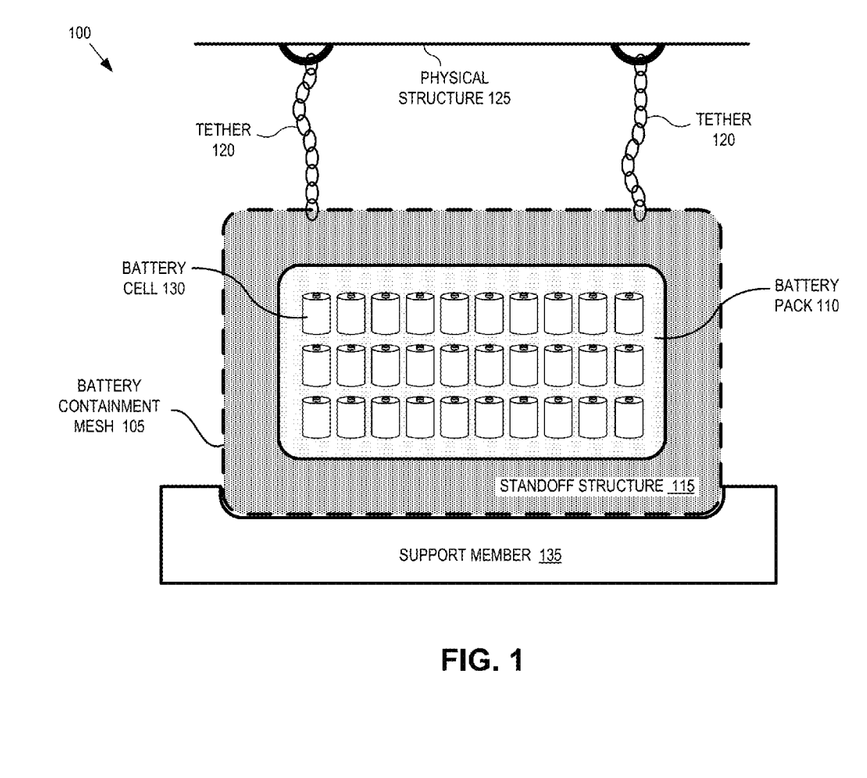
FIG. 1 illustrates a battery containment mesh that operates as a non-pressure vessel for containing the remnants of a combusted battery pack, in accordance with an embodiment of the disclosure.

FIG. 1 illustrates a safety system 100 including a battery containment mesh 105 that operates as a non-pressure vessel for containing the remnants of a battery pack 110 in the event of catastrophic combustion, in accordance with an embodiment of the disclosure. The illustrated embodiment of safety system 100 includes battery containment mesh 105 surrounding battery pack 110, a standoff structure 115, and tethers 120 anchored to a physical structure 125. Battery pack 110 includes a plurality of interconnected battery cells 130. A support member 135 is present to securely hold battery pack 110 during regular operation.

Battery containment mesh 105 is a net sized to surround battery pack 110 and fabricated of heat resistant materials that are resilient to the conditions of a catastrophic failure to the point of combustion of battery pack 110. For example, during the combustion of a lithium ion battery back, temperatures may range between 800° C. to 1400° C., though the temperature may vary significantly across the battery pack, individual battery cells, and different parts of the flames. Battery containment mesh 105 is capable of maintaining sufficient physical integrity in the event of battery combustion such that it can carry the weight of the burned out remnants of battery pack 110 via tethers 120 even if support member 135 is destroyed during the battery combustion. The net formed by battery containment mesh 105 can be sized according to the weight of battery pack 110. In some instances the battery containment mesh 105 is formed of materials capable of maintaining structural integrity in the presence of a battery pack combustion that is greater than 800° C., or even greater than 1400° C. Battery pack 110 may represent a variety of different battery technologies including lithium ion batteries, nickel-metal hydride batteries, nickel-cadmium batteries, gel batteries, absorbed glass mat batteries, or otherwise.

Battery containment mesh 105 does not attempt to contain the fire, heat, or exhaust gases produced during combustion of battery pack 110. Battery containment mesh 105 does not attempt to act as a pressure vessel against the rapidly expanding combustion gasses and does not attempt to overpower the thermal energy released from battery pack 110 during catastrophic failure with large cooling action to protect surrounding structures. Rather, battery containment mesh 105 is formed using an open net structure that permits high temperature gases to pass freely through holes in the mesh, greatly decreasing the required structural strength of the overall net. The materials of the mesh need only be capable of maintaining integrity in the presence of the high combustion temperatures during the relatively short combustion event, since the open mesh structure permits the fire and gases to quickly escape. This solution maintains a high energy density for the overall battery pack 110 and containment mesh 105 that is suitable for weight sensitive applications (e.g., aerial vehicles). Battery containment mesh 105 prevents the burned out remnants of battery pack 110 from breaking loose from its vehicle or larger structure in which it is contained.

Since battery containment mesh 105 does not attempt to contain the exhaust gases or fire, other safeguards may be implemented to protect other components surrounding battery pack 110 from damage in the event of catastrophic failure. In some cases, maintaining minimum standoff distances from critical structures along with wrapping local critical structures with sheets of foil may be sufficient precautionary measures. Of course, battery containment mesh 105 may be used in conjunction with other pressure or thermal containment measures.

Safety system 100 may be implemented in a variety of different vehicles as a safety precaution to prevent battery remnants from breaking free of the vehicle after a combustion event. For example, safety system 100 may be used in aerial vehicles (unmanned aerial vehicles, manned aerial vehicles, planes, helicopters, etc.), automobiles, trains, or other mobile vehicles. As mentioned above, battery containment mesh 105 may be sized according to the volume and weight of the enclosed battery pack 110. Similarly, the size, strength, and number of tethers 120 can also be selected according to the weights and expected forces present during and after a catastrophic failure. In weight sensitive applications, battery containment mesh 105 can ease the design constraints on support member 135. For example, support member 135 need not be designed to survive a catastrophic failure of battery pack 110, enabling designer to use smaller, lighter weight structures to support battery pack 110 during normal operation.

In the illustrated embodiment, battery pack 110 is illustrated as being physically separated or offset from battery containment mesh 105 by standoff structure 115. Standoff structure 115 provides a physical gap between battery pack 110 and battery containment mesh 105, which serves to reduce the peak structural/thermal stresses to which the net is subjected. Standoff structure 115 may provide a relatively small standoff distance (e.g., 0.5 inches to 5 inches) between battery pack 110 and battery containment mesh 105. In one embodiment, standoff structure 115 is implemented as a foam or other low density blanket material wrapped around battery pack 110. In another embodiment, standoff structure 115 is implemented using a rigid, but lightweight material (plastic foam). Standoff layer 115 may be implemented with a variety of lightweight, low melting point materials. In such embodiments, standoff layer 115 is not a pressure containment vessel and may quickly burn away in the initial stages of a catastrophic combustion event. Thus, in some embodiments, standoff structure 115 merely provides physical separation between battery pack 110 and battery containment mesh 105 for the initial explosive stages of a combustion event, where the physical separation can help temporarily reduce failure stresses when they are greatest.

Figure 2:
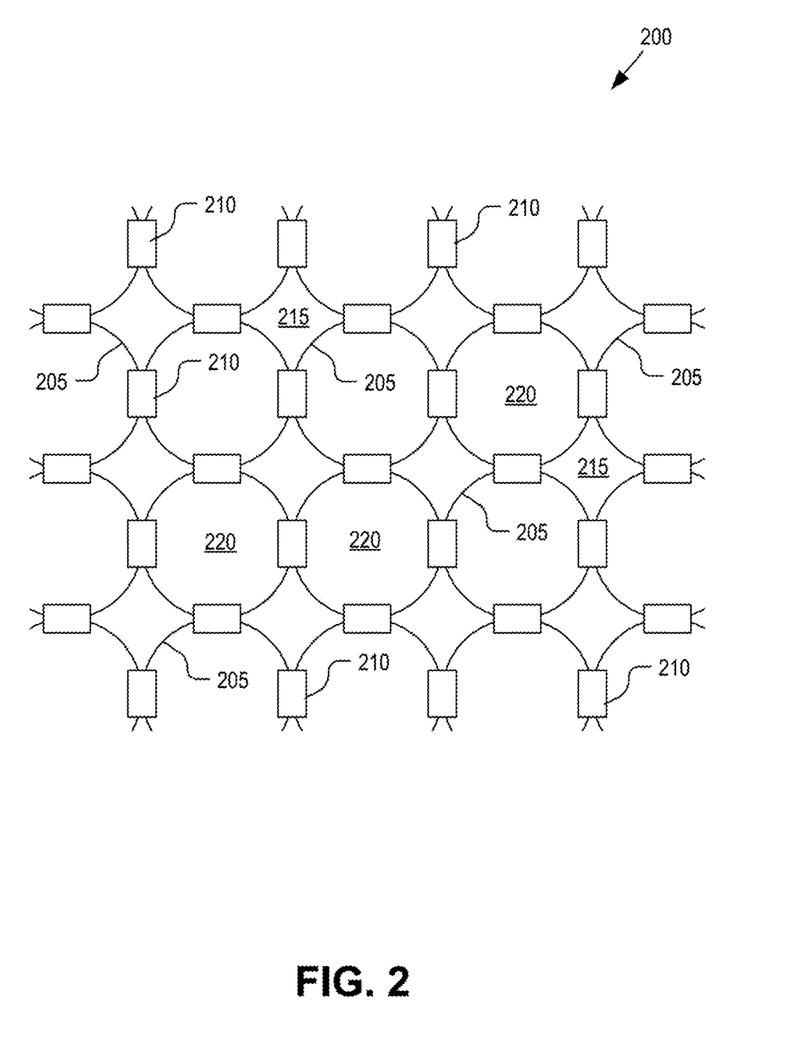
FIG. 2 is an expanded view illustration of the loops and joiners that make up the battery containment mesh, in accordance with an embodiment of the disclosure.

FIG. 2 is an expanded view illustration of a portion of a battery containment mesh 200, in accordance with an embodiment of the disclosure. Battery containment mesh 200 is one possible implementation of battery containment mesh 105. The illustrated embodiment of battery containment mesh 200 includes loops 205 defining open apertures 220 and joiners 210.

Joiners 210 serve to interconnect the individual loops 205 into a net or mesh structure. In the illustrated embodiment, loops 205 disposed at an interior portion of the mesh are interconnected to four other loops 205 by four corresponding joiners 210. Each loop 205 is a closed loop that defines an open aperture 220 to freely pass exhaust gases during combustion events. The diameter of each loop 205 (or size of open aperture 220) may be selected to ensure that individual battery cells 130 cannot fall through the net formed by loops 205. Thus both open apertures 220 and intermediate spaces 215 are small enough to prevent a battery cell 130 that has been separated from the pack due to a fire from falling through battery containment mesh 200. In yet another embodiment, loops 205 are optionally small enough so as to be incapable to electrically bridging the distance between the two terminals of a single battery cell 130. By keeping the individual loops 205 sufficiently small (while large enough to allow exhaust gases to freely pass), the risk of electrical shorts is reduced.

Loops 205 and joiners 210 are fabricated of heat resistant materials capable of maintaining physical integrity in an event of combustion of battery pack 110. In some embodiments, loops 205 may be implemented as metal wire loops. In one embodiment, the metal wire loops are made of a nickel-chromium-based superalloy. In other embodiments, loops 205 may be fabricated of other materials such as stainless steel, refractory metals/alloys, ceramic fiber yarns, or otherwise. The gauge of the metal wire loops may be selected based upon the weight of battery pack 110 and the forces expected during a failure event.

Figure 3:
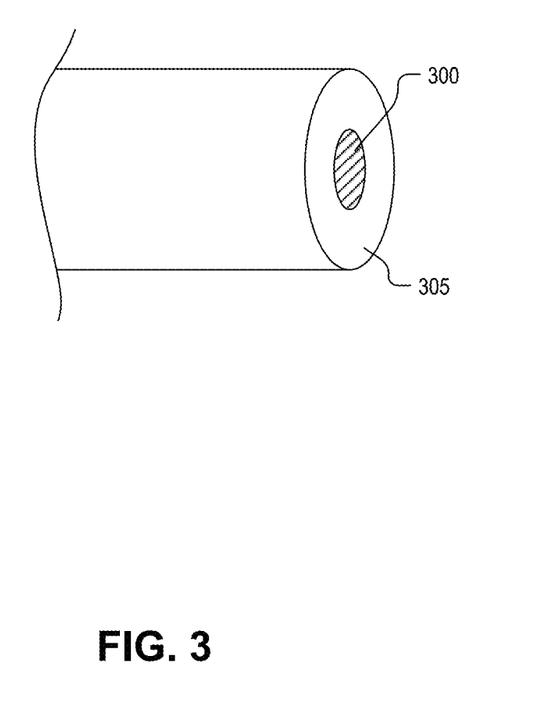
FIG. 3 is an expanded view illustration of wire for forming a loop of a battery containment mesh, in accordance with an embodiment of the disclosure.

FIG. 3 is an expanded view illustration of wire 300 for forming a loop of a battery containment mesh, in accordance with an embodiment of the disclosure. Wire 300 is one possible implementation of loops 205. As illustrated in FIG. 3, wire 300 is coated with an insulator 305. Insulator 305 may be an electrical insulator to reduce the likelihood of electrical shorts and/or a thermal insulator to improve the heat resistant characteristics of wire 300. In one embodiment, insulator 305 is an intumescent coating that swells when exposed to heat to provide greater fire protection. In one embodiment, the entire battery containment mesh 200, including loops 205 and joiners 210, is coated with an intumescent material.

Figure 4:
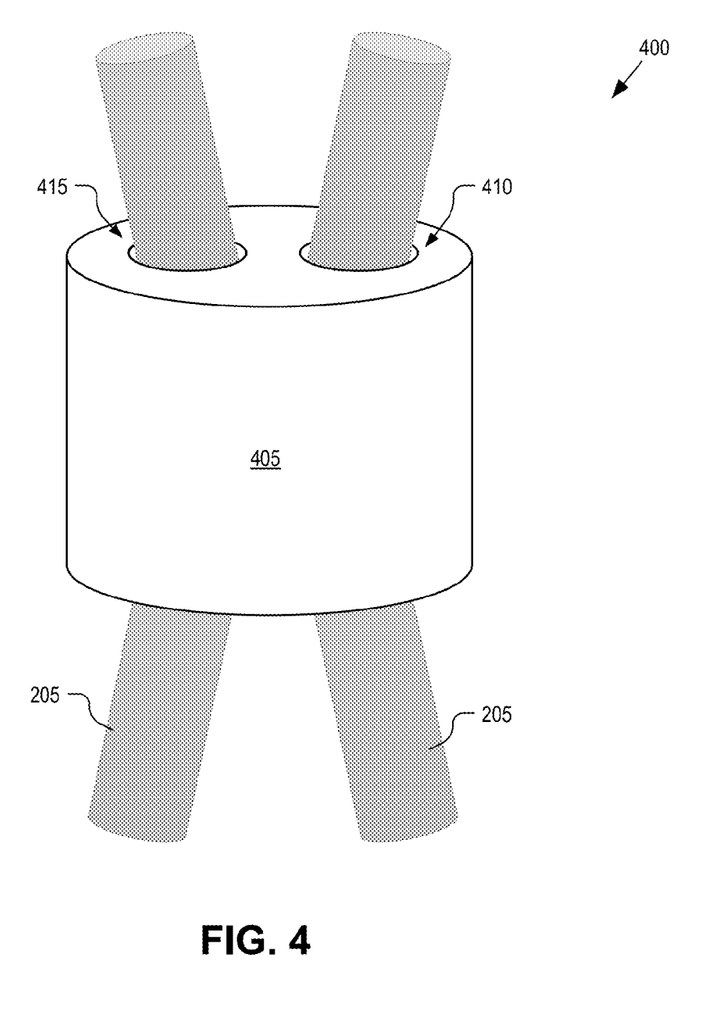
FIG. 4 is an expanded view illustration of a joiner of a battery containment mesh, in accordance with an embodiment of the disclosure.

FIG. 4 is an expanded view illustration of a joiner 400 of a battery containment mesh, in accordance with an embodiment of the disclosure. Joiner 400 is one possible implementation of joiners 210 illustrated in FIG. 2. The illustrated embodiment of joiner 400 includes a body element 405 having two holes 410 and 415 that pass through the body element 405. In the illustrated embodiment, body element 405 is cylindrical in shape; however, other shapes may be implemented.

Loops 205 each pass through a respective one of holes 410 and 415. In one embodiment, body element 405 operates as an isolator that physically and electrically isolates the two separate loops 205 it interconnects. For example, joiner 400 may be fabricated of a heat resistant and electrically insulating material, such as high temperature ceramics (e.g., aluminum oxide). Holes 410 and 415 are physically offset from each other and do not intersect to prevent electrical connection between the two loops 205. By electrically isolating loops 205 from each other, currents cannot flow across battery containment mesh 200, thereby reducing the likelihood of electrical shorts with battery pack 110.

The combination of insulated joiners 400 and an intumescent coating over loops 205 decreases the chance of any wire or wire joint being able to short to a battery cell 130. The combination of insulated joiners 400 and keeping the size of individual loops 205 modest in size decreases the chance of a multi-loop short across one or more battery cells 130. The low surface area of the components of battery containment mesh 200, compared to a fibrous solution, reduces the vulnerability of the structure to a chemical attack from the rapid exhaust of combustion gases. Battery containment mesh 200 achieves the above fire protection measures in a lightweight solution. For example, in one embodiment, safety system 100 can add as little as two percent to the overall mass of battery pack 110.

Figure 5A:
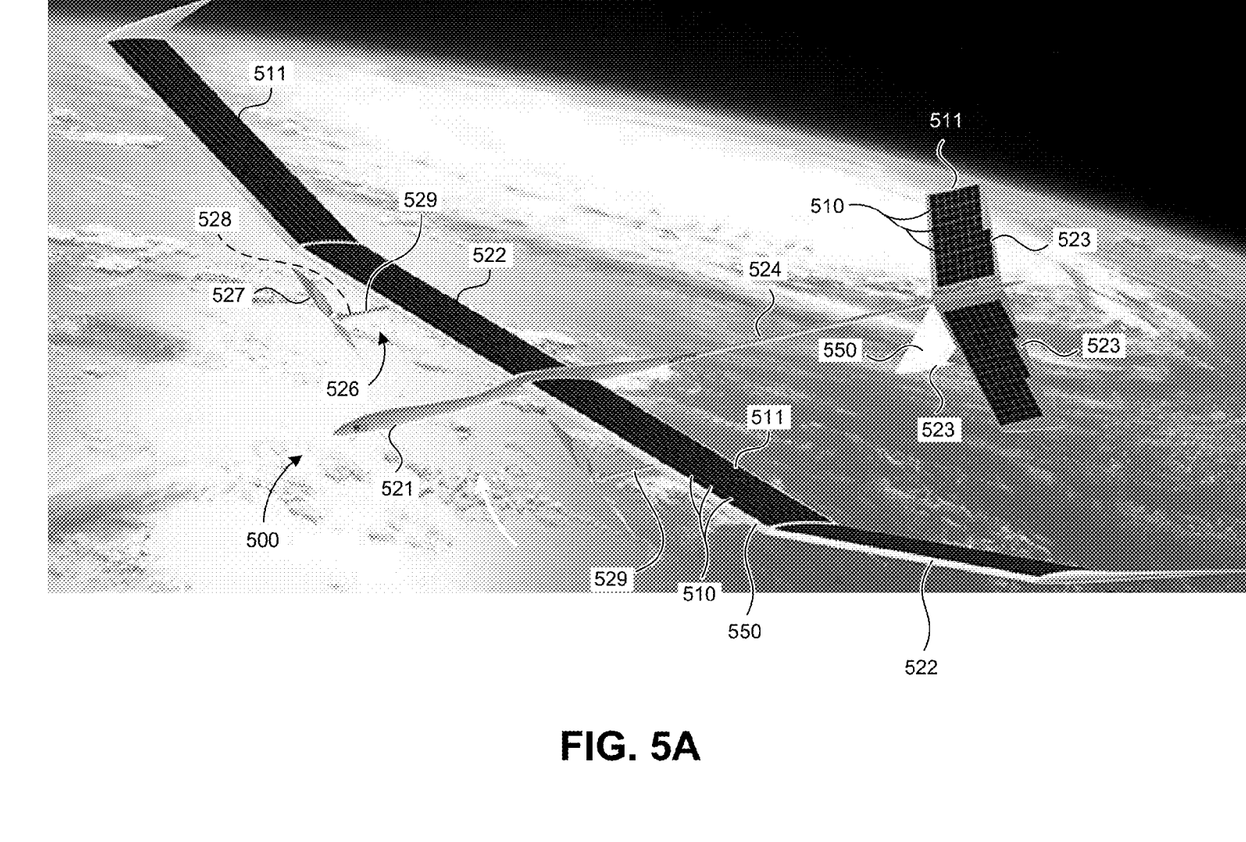
FIGS. 5A and 5B illustrate aerial vehicles that include sub-systems powered by a battery pack that can be contained within a battery containment mesh, in accordance with an embodiment of the disclosure.

FIG. 5A is an illustration of an aerospace system that includes an aerial vehicle 500, such as an unmanned air vehicle (UAV), that includes sub-systems powered by a battery pack that can be contained within a fire safety system including a battery containment mesh, in accordance with an embodiment of the disclosure.

The aerial vehicle 500 can be particularly configured to fly at very high altitudes (e.g., 65,000 ft) under power produced by multiple solar cells 510. In a particular embodiment, the aerial vehicle 500 includes a narrow, elongated fuselage 521 coupled to one or more wings 522 or other lifting surfaces. The aerial vehicle 500 can further include a stabilizer boom or empennage 524 carrying one or more stabilizers 523 that provide stability and control functions. The aerial vehicle 500 can still further include a propulsion system 526, which can in turn include one or more nacelles 529, each of which houses an electric motor 528 that powers a corresponding propeller 527.

UAVs have proliferated recently because they can perform a variety of valuable tasks without incurring the costs and risks associated with a piloted aircraft. Typical UAV tasks include public safety and communication tasks. However, one drawback with many existing UAVs is that they have limited endurance and can accordingly remain on-station for only a limited period of time. As a result, it can be difficult to provide the foregoing tasks consistently for an extended period of time.

One approach to addressing the foregoing endurance issues is to provide solar power to a UAV, potentially enabling the UAV to remain on-station for extended periods of time because it generates the power it requires while in flight. These solar powered UAVs may use battery packs. However, battery packs with conventional safety enclosures tend to be heavy and/or expensive both of which are deleterious to the cost and operation UAVs. Power for the propulsion system 526 is provided by the solar cells 510, which charge the battery packs. The solar cells 510 can be arranged in a plurality of panels or arrays 511 that are carried by the aerial vehicle 500. Elements of the aircraft (e.g., the wings 522 and/or the stabilizers 523) can include one or more substrates 550.

Figure 5B:
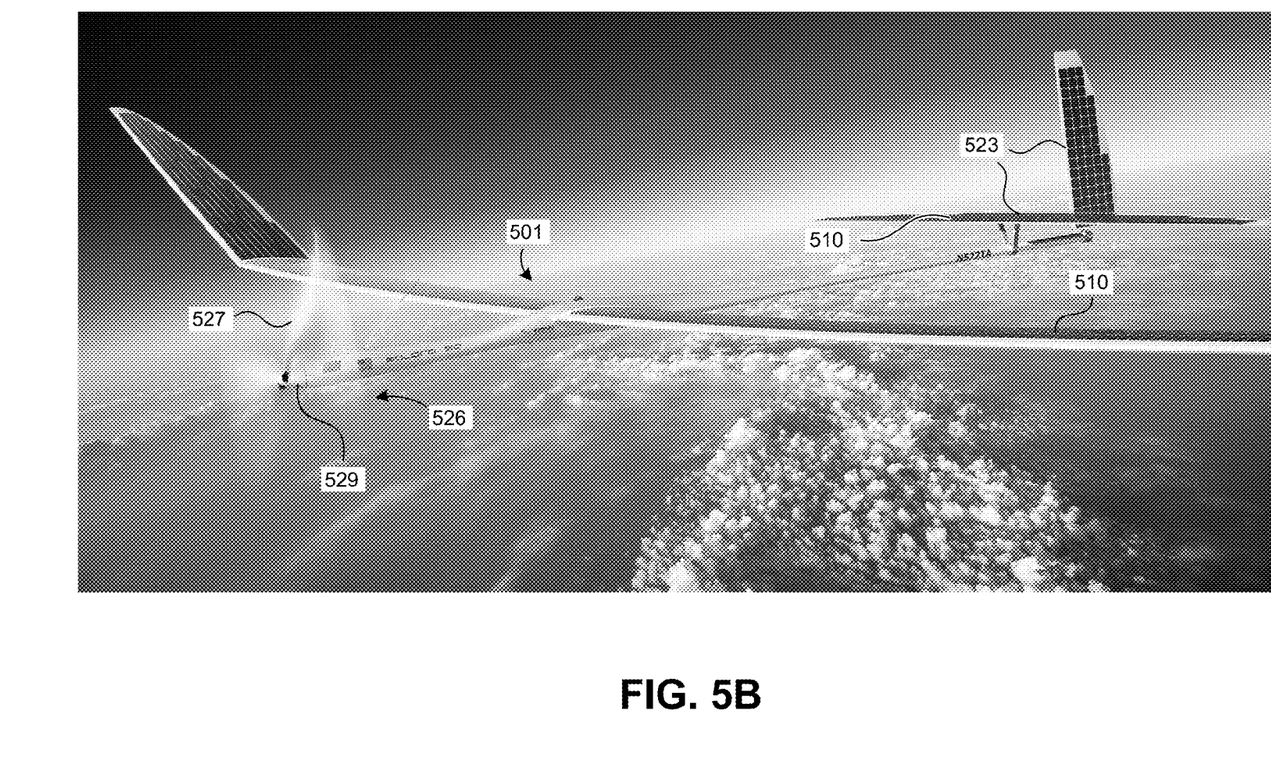

FIG. 5B is a partially schematic side elevation view of an aerospace system including an aerial vehicle 501 having a different configuration than that shown in FIG. 5A. For example, the propulsion system 526 includes a single nacelle 529 and a single propeller 527, and the stabilizers 523 are oriented orthogonal to each other. The solar cells 510 are integrated with the aircraft structure in a manner identical to or generally similar to that of the aerial vehicle 500 shown in FIG. 5A.

Both aerial vehicles 500 and 501 may include battery packs to power on-board electrical sub-systems (e.g., propulsion systems 526, actuators for adjusting flight surfaces, communication systems, navigation system, control systems, etc.). Solar cells 510 may be coupled to the battery packs to provide continuous charging when solar energy is incident upon their surfaces. Aerial vehicles 500 and 501 may include embodiments of safety system 100 to provide lightweight containment measures to ensure their battery packs do not drop to the ground in the event of a catastrophic battery fire.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus, comprising:
 a battery containment mesh including:
  a plurality of loops, wherein the loops comprise metal wire loops; and
  a plurality of joiners that interconnect the loops into a net sized to surround a battery pack including a plurality of battery cells, wherein the joiners comprise electrical insulators that electrically insulate the metal wire loops to prevent electrical shorts across multiple loops of the battery containment mesh,
 wherein the loops and the joiners are fabricated of heat resistant materials capable of maintaining physical integrity in an event of combustion of the battery pack such that the battery containment mesh can carry a weight of the battery pack after the event of combustion.

2. The apparatus of claim 1, wherein the loops each form an open aperture that freely passes exhaust gases during the event of combustion.

3. The apparatus of claim 2, wherein the open aperture of each of the loops is small enough to prevent an individual battery cell of the battery pack from falling through the open aperture.

4. The apparatus of claim 1, wherein the metal wire loops each comprise a nickel-chromium-based superalloy.

5. The apparatus of claim 1, wherein the loops are coated with an intumescent.

6. The apparatus of claim 1, wherein the joiners comprise electrical insulators that electrically insulate the loops from each other.

7. The apparatus of claim 6, wherein the joiners each comprise:
   a body element;
   a first hole passing through the body element; and
   a second hole passing through the body element, the second hole being physically separated from the first hole,
   wherein first and second loops of the net pass through the first and second holes of a given one of the joiners, respectively.

8. The apparatus of claim 7, wherein loops positioned on an interior portion of the net each pass through four different joiners.

9. The apparatus of claim 6, wherein the joiners comprise ceramic.

10. The apparatus of claim 1, further comprising:
    one or more tethers for tethering the battery containment mesh to a physical structure.

11. The apparatus of claim 1, further comprising:
    a standoff structure disposed between the battery pack and the battery containment mesh to provide physical separation between all of the battery pack and all of the battery containment mesh prior to the event of combustion.

12. The apparatus of claim 11, wherein the standoff structure comprises a layer of foam.

13. The apparatus of claim 1, wherein the loops have a small enough size that is incapable of electrically bridging a distance between terminals of a single one of the battery cells.

14. An aerial vehicle, comprising:
    an electrical sub-system;
    a battery pack including a plurality of interconnected battery cells coupled to power the electrical sub-system;
    a battery containment mesh surrounding the battery pack, the battery containment mesh including:
       a plurality of loops; and
       a plurality of joiners that interconnect the loops into a net sized to surround the battery pack, wherein the joiners comprise ceramic electrical insulators that electrically insulate the loops from each other,
    wherein the loops and the joiners are fabricated of heat resistant materials capable of maintaining physical integrity in an event of combustion of the battery pack such that the battery containment mesh can carry a weight of the battery pack after the event of combustion;
    a support member to hold the battery pack and battery containment mesh during operation of the aerial vehicle;
    a structural member of the aerial vehicle separate from the support member; and
    one or more tethers physically linking the containment mesh to the structural member to hold the battery pack in the event of combustion should the event of combustion cause the support member to no longer hold the battery pack.

15. The aerial vehicle of claim 14, wherein the loops each form an open aperture that freely passes exhaust gases during the event of combustion and are each small enough to prevent an individual battery cell of the battery pack from falling through the open aperture.

16. The aerial vehicle of claim 15, wherein the loops comprise metal wire loops.

17. The aerial vehicle of claim 14, wherein the loops are coated with an intumescent.

18. The aerial vehicle of claim 14, wherein the joiners each comprise:
    a body element;
    a first hole passing through the body element; and
    a second hole passing through the body element, the second hole being physically separated from the first hole,
    wherein first and second loops of the net pass through the first and second holes of a given one of the joiners, respectively.

19. The aerial vehicle of claim 14, further comprising:
    a standoff structure disposed between the battery pack and the containment mesh to provide physical separation between all of the battery pack and all of the battery containment mesh prior to the event of combustion.

* * * * *